Oct. 2, 1962 J. D. RUHALA ETAL 3,056,177
WINDSHIELD WASHER NOZZLE AND CLIP ASSEMBLY
Filed Oct. 29, 1958

INVENTORS
JOSEPH D. RUHALA
RICHARD L. JONES
BY
THEIR ATTORNEY 3,056,177
WINDSHIELD WASHER NOZZLE AND CLIP ASSEMBLY
Joseph D. Ruhala, Royal Oak, and Richard L. Jones, Detroit, Mich., assignors to General Motors Corporation, Detroit, Mich., a corporation of Delaware
Filed Oct. 29, 1958, Ser. No. 770,488
2 Claims. (Cl. 20—40.5)

This invention pertains to the art of windshield cleaning, and particularly to an improved spray nozzle and clip assembly for vehicles.

Heretofore, two types of spray nozzles have been used on vehicles. One type of spray nozzle is formed as an integral part of the escutcheon plate covering the opening in the cowl through which the pivot shaft extends, and the other is a formed metal tube nozzle rigidly attached to the vehicle cowl and extending through a louver in the cowl ventilator. The present invention pertains to an improved integral hose and nozzle assembly together with adjustable clip means for attaching the integral hose and nozzle assembly on the vehicle. Accordingly, among our objects are the provision of an integral nozzle and hose assembly including means for locating the assembly relative to a supporting clip; the further provision of an integral supporting clip for a nozzle assembly which can be adjusted relative to the vehicle; and the still further provision of a windshield washer nozzle and clip assembly capable of adjustment including means for automatically retaining the assembly in the selected adjusted position.

The aforementioned and other objects are accomplished in the present invention by upsetting one end portion of a plastic tube to form a nozzle and locating means, and utilizing a spring clip for supporting the nozzle end of the tube. Specifically, the plastic tube, or hose, may be of circular configuration having an upset end of substantially rectangular configuration with a spray orifice at the outer end thereof. The upset end of the tube is formed with an integral locating projection, and the upset end is supported by a spring clip which may be formed of stainless steel. The integral spring clip includes a bifurcated portion which resiliently engages the tubing and a pair of legs which resiliently engage the louvers in a cowl ventilator. The clip end nozzle assembly can be longitudinally adjusted within the cowl ventilator to any selected position, and the assembly will be retained in the selected adjusted position due to the inherent resiliency of the spring metal clip.

Further objects and advantages of the present invention will be apparent from the following description, reference being had to the accompanying drawings, wherein a preferred embodiment of the present invention is clearly shown.

Figure 1:
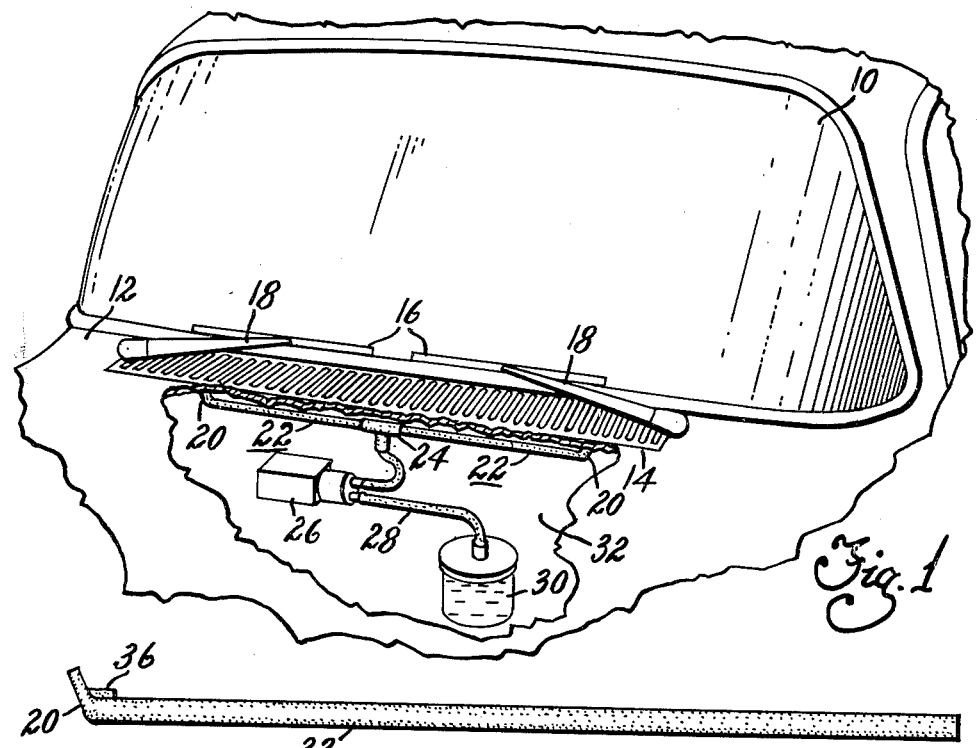
FIGURE 1 is a fragmentary view of a vehicle, with certain parts broken away, equipped with the windshield washer nozzle and clip assembly of this invention.

With particular reference to FIGURE 1, a portion of a vehicle is shown including a windshield 10 and a cowl 12 having a louvered cowl ventilator 14. In accordance with conventional practice, the vehicle is equipped with a pair of wiper arm and blade assemblies including blades 16 and arms 18. The arms 18 are oscillated asymmetrically from a suitable motor, not shown. The vehicle is also equipped with a pair of spray nozzles 20 adjustably mounted in the cowl ventilator 14.

Figure 2:
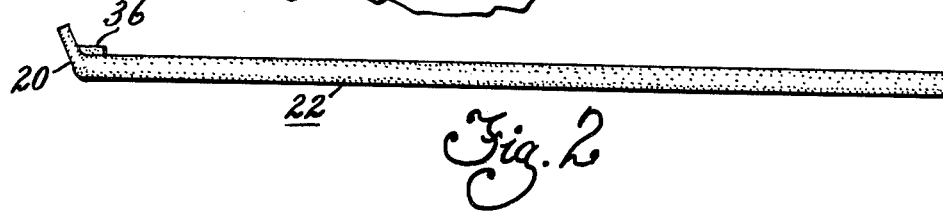
FIGURE 2 is a view in elevation of the integral hose and nozzle assembly.

With reference to FIGURE 2, each spray nozzle 20 is integral with a washer hose, or tube, 22 which may be composed of any suitable plastic. The inner ends of the tubes 22, as shown in FIGURE 1, are attached to a T-coupling 24 which communicates with the delivery side of a washer pump 26. The inlet side of the washer pump 26. The inlet side of the washer pump is connected by tube 28 to a reservoir 30 containing liquid solvent, the reservoir 30 being supported on the vehicle firewall 32.

Figures 3, 4, 5:
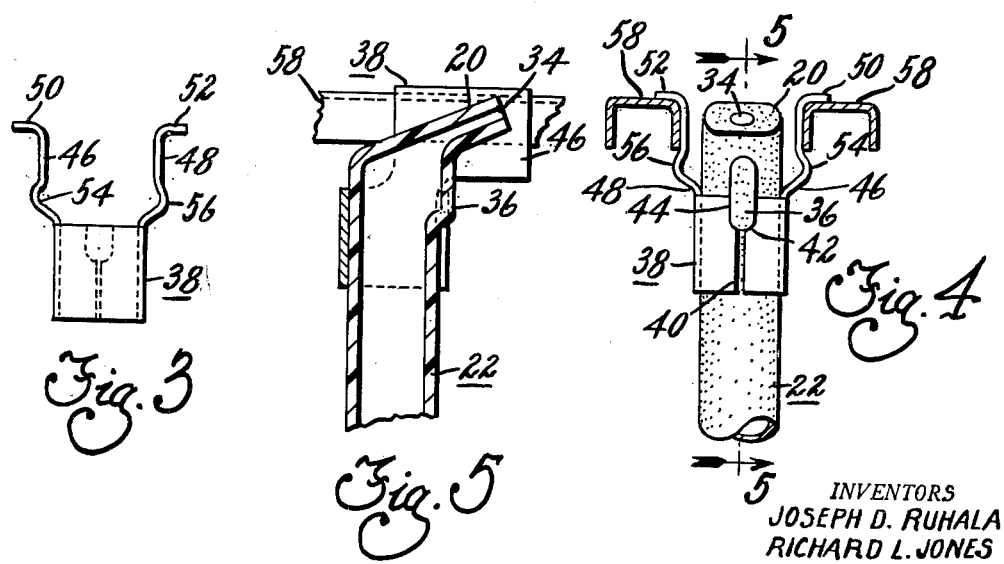
FIGURE 3 is a view in elevation of the nozzle supporting clip.
FIGURE 4 is a fragmentary view, partly in section and partly in elevation, illustrating the manner of attachment of the clip and nozzle assembly in a vehicle.
FIGURE 5 is a fragmentary sectional view taken along line 5—5 of FIGURE 4.

With reference to FIGURES 4 and 5, the nozzle portion 20 of the integral tube and nozzle assembly 22 is formed by upsetting the end of the tube 22 to form a section of substantially rectangular cross section, as seen in FIGURE 4, having a spray orifice 34. In addition, the upset end of the tube 22 is formed with a locating boss 36.

The integral nozzle and tube assembly is supported by a clip 38, shown in FIGURE 3. The clip 38 includes a bifurcated portion 40 having cutouts 42 and 44 which surround a circular portion of the tube 22 and engage a locating boss 36 of the spray nozzle 20. The clip 38 may be formed of any suitable spring metal, such as stainless steel, so as to resiliently engage and apply pressure to the tube 22. The clip 38 is also formed with a pair of upstanding legs 46 and 48 having flanged ends 50 and 52 and kinked portions 54 and 56. By virtue of the clip being composed of spring metal, the legs 46 and 48 are inherently biased away from each other.

Referring again to FIGURES 4 and 5, the legs 46 and 48 engage the spaced louvers 58 of the cowl ventilator 14. Since the louvers 58 extend fore and aft of the cowl 12, it is readily apparent that the nozzle and clip assembly can be adjustably supported in a plurality of positions relative to the windshield 10 thereby varying the area which the liquid solvent discharged from the nozzle impinges against the windshield. To adjust the position of the spray nozzles, it is only necessary to compress the legs 46 and 48, by means of any suitable hand tool, and slide the nozzle and clip assembly either fore or aft relative to the cowl ventilator, and upon release of the legs 46 and 48 they will resiliently engage the louvers 58 to lock the clip and nozzle assembly in the selected adjusted position.

While the embodiment of the invention as herein disclosed constitutes a preferred form, it is to be understood that other forms might be adopted.

What is claimed is as follows:

1. A nozzle and clip assembly for a vehicle windshield washer comprising, a tube having an upset end with a spray orifice and a locating boss, and a spring clip having a bifurcated portion with cut-outs engageable with said tube and locating boss, and a pair of upstanding legs resiliently engageable with a support to retain the nozzle and clip assembly in adjusted position.

2. In a vehicle having a windshield and a louvered cowl ventilator, an adjustable windshield washer nozzle and clip assembly mounted in said cowl ventilator comprising a nozzle element and a spring clip, said spring clip supporting said nozzle element and having a pair of upstanding legs resiliently engaging the louvers of said cowl ventilator to retain said nozzle and clip assembly in adjusted position relative thereto.

References Cited in the file of this patent

UNITED STATES PATENTS

| | | |
|---|---|---|
| 704,225 | Weingaertner | July 8, 1902 |
| 1,287,846 | Blake | Dec. 17, 1918 |
| 2,586,145 | Breuer et al. | Feb. 19, 1952 |
| 2,641,036 | Reiter | June 9, 1953 |
| 2,655,408 | Williams | Oct. 13, 1953 |
| 2,687,329 | Hunter | Aug. 24, 1954 |
| 2,860,396 | Reiter | Nov. 18, 1958 |
| 2,873,999 | Webb | Feb. 17, 1959 |
| 2,961,168 | Webb | Nov. 22, 1960 |

FOREIGN PATENTS

| | | |
|---|---|---|
| 577,589 | Great Britain | May 23, 1946 |